Nov. 8, 1966  C. C. HACH  3,284,164
APPARATUS FOR AUTOMATIC ANALYZING
Original Filed April 19, 1960  2 Sheets-Sheet 1

INVENTOR.
Clifford C. Hach
BY
Wolfe, Hubbard, Voit + Osann
Attys.

Nov. 8, 1966 C. C. HACH 3,284,164
APPARATUS FOR AUTOMATIC ANALYZING
Original Filed April 19, 1960 2 Sheets-Sheet 2

INVENTOR.
Clifford C. Hach
BY
Wolfe, Hubbard, Voit & Osann
Attys.

United States Patent Office
3,284,164
Patented Nov. 8, 1966

3,284,164
APPARATUS FOR AUTOMATIC ANALYZING
Clifford C. Hach, Ames, Iowa, assignor to Hach Chemical Company, Ames, Iowa, a corporation of Iowa
Original application Apr. 19, 1960, Ser. No. 23,246, now Patent No. 3,186,799, dated June 1, 1965. Divided and this application Dec. 16, 1964, Ser. No. 418,688
2 Claims. (Cl. 23—253)

This application is a division of my copending application, Serial No. 23,246, filed April 19, 1960, now U.S. Patent No. 3,186,799.

The present invention relates to methods and devices for making chemical analyses and concerns, more particularly, methods and analyzers capable of automatically and continuously performing any one of a wide variety of chemical tests.

It is the primary aim of the invention to provide an analyzing method and automatic analyzers which obviate the necessity for manually performing chemical analyses that are made as a routine check of some process. For example, in water treatment plants, analyzers practicing the present invention can be used to test for residual chlorine, pH, fluorides, alkalinity, total hardness or a desired hardness level, and thus provide information as to the operation of the plant without requiring the services of a trained person. The analyzers of the invention thus free plant personnel from routine testing jobs and minimize the possibility of human error.

Moreover, analyzers embodying the invention are capable of routinely performing titrametric analyses so that a wide variety of chemical analyzing tasks can be handled, all on an automatic basis. Indeed, analyzers constructed in accordance with the invention can be used to perform any spectrophotometric titration or simple colorimetric test in which the sample is reasonably clear and no precipitate is formed.

Another object of the invention is to provide an automatic analyzer and method of analyzing of the above character which function on a continuously flowing fluid sample so as to make continuous testing possible.

It is also an object to provide an automatic analyzer, as described above, which is quite accurate and very reliable, needing little or no routine maintenance other than periodic replenishing of the test solutions being used. It is a collateral object to provide an automatic analyzer of this type which is inexpensive to manufacture and operate, particularly because of a relatively simple design using few moving parts such as pumps or valves.

A further object is to provide an automatic analyzer that is very convenient to use, both as to setting up the unit for performance of a particular test and reading or recording the results of the testing.

It is still another object to provide an automatic analyzer which is exceptionally versatile in that a wide variety of tests can be performed and that the test information can be displayed, recorded or used in a variety of ways.

Other objects and advantages of the invention will become apparent upon reading the following detailed description and upon reference to the drawings in which.

While the invention will be described in connection with certain preferred embodiments and procedures, it will be understood that I do not intend to limit the invention to those embodiments and procedures. On the contrary, I intend to cover all alternatives, modifications and equivalents as may be included within the spirit and scope of the invention as defined by the appended claims.

Figure 1:
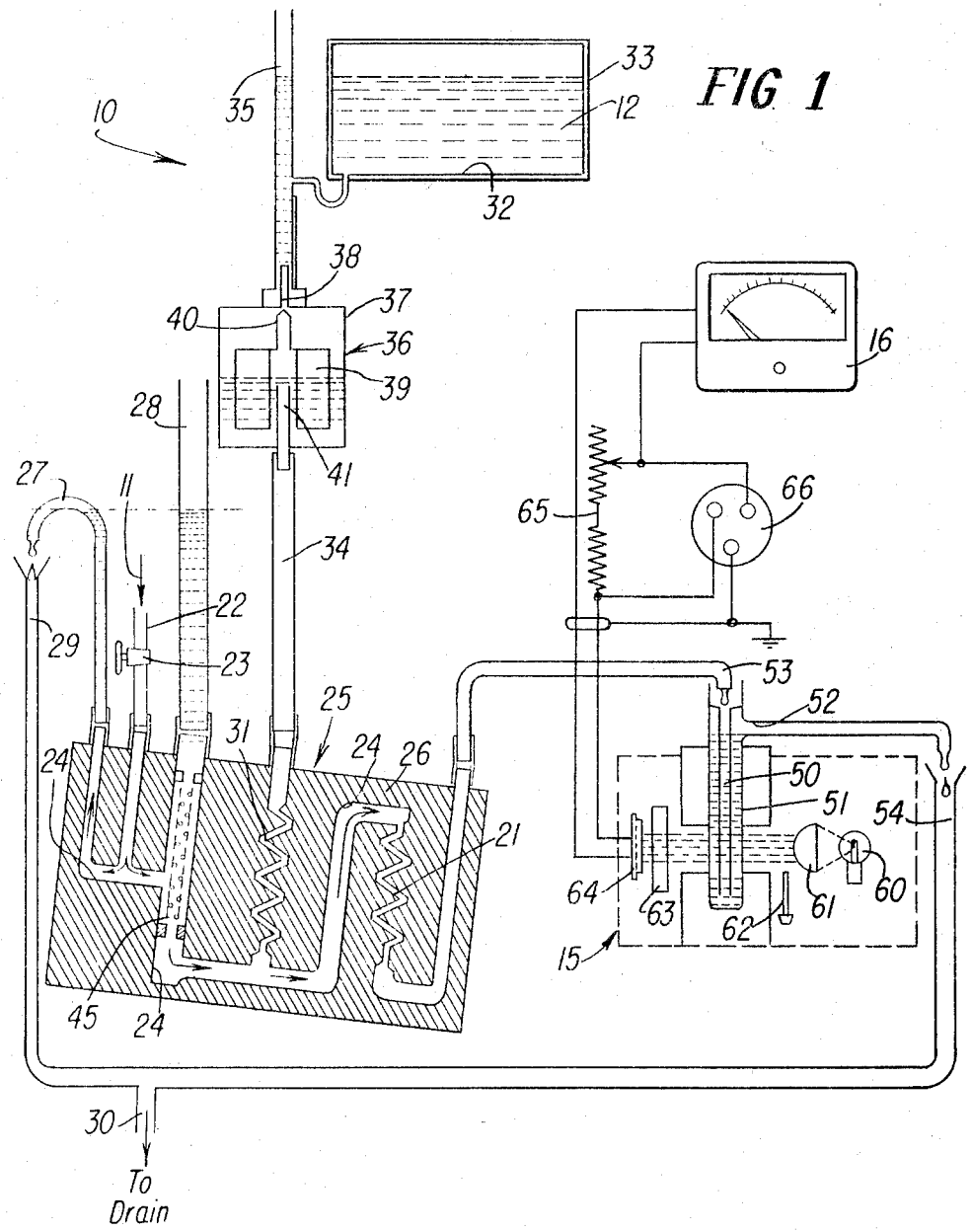
FIGURE 1 is a diagrammatic representation of an automatic analyzer constructed in accordance with the present invention.

Turning first to FIG. 1 there is schematically shown an analyzer 10 for performing the method of, and constructed in accordance with, the invention. The particular embodiment shown in this figure is intended for continuous colorimetric testing of a fluid sample 11 by using measured quantities of a known fluid reagent 12.

In accordance with the invention, the method of testing includes the steps of creating a steady and uniform stream of the sample 11, adding to the stream a predetermined and uniform flow of the reagent 12, mixing the sample and reagent, flowing the mixture constantly and uniformly through a cell, and detecting any reaction caused by mixing the measured quantities of sample and reagent in the cell. In the preferred FIG. 1 embodiment, the reaction is detected by a colorimeter 15 whose electrical output is indicated by a galvanometer 16. The galvanometer 16 gives a continuous reading reflecting the extent of color change produced by the reaction of the sample 11 and reagent 12 in the colorimeter 15. Hence, by knowing the nature and concentration of the reagent 12, and the amounts of sample and reagent being continuously brought together, the analyzer 10 accurately indicates the presence and concentration of the unknown in the sample under test.

To carry out the invention, the analyzer 10 includes apparatus for accomplishing continuously the several steps listed above so as to capably and automatically perform the method of the invention. In describing the preferred form of the analyzer 10, specific values will be given as an aid to understanding the functions of the apparatus and although these values are used in commercial analyzers embodying the invention, it will be understood that the invention is not restricted to any one particular set of values.

Turning to the construction of the analyzer 10, in order to create a steady and uniform stream of the sample 11, the sample is fed at a constant head pressure through a capillary metering tube 21. In the preferred construction, a conduit 22 conducts the sample through a flow-control cock 23 to a mixing passage 24. The metering tube 21, conduit 22 and passage 24 are all fixed relative to one another by a common frame 25. In the preferred apparatus, the metering tube 21 and the passage 24 are defined by suitably formed glass tubing which is embedded in a plastic frame block 26 that is effective to protect the glass parts and hold them in the desired relative positions.

To maintain a constant head pressure on the sample 11 in the passage 24, an upstanding overflow outlet or passage 27 is mounted on the frame 25 in communication with the passage 24. The fluid overflowing from the outlet 27 spills into a conduit 29 that is connected to a drain 30. An open-top sight glass 28 is also provided to visually indicate the head of the sample. In a workable embodiment, the cock 23 is adjusted to provide a sample flow of 100 mls./min. The capillary metering tube 21 is formed of such a length and diameter as to pass 5 mls./min. with the particular sample head established by the overflow outlet 27. The fluid sample which does not pass through the metering tube 21 is simple spilled through the overflow outlet 27 to the drain 30 as is shown by the flow arrows appearing in FIG. 1 in the passage 24.

For adding a steady and uniform stream of reagent 12 to the stream of the sample, the reagent is fed to the passage 24 at a predetermined head pressure through a capillary metering tube 31. In the illustrated analyzer, the reagent 12 is contained in a five quart plastic bag 32 supported within a carton 33 and is fed to the metering tube through a conduit 34. A sight glass 35 provides a visual indication of the amount of reagent solution remaining in the bag 32.

To maintain a predetermined head pressure on the reagent 12, a float valve 36 is interposed in the conduit 34. The float valve includes a chamber 37 having an upper valve inlet opening 38 and containing a float 39 which supports a plug 40 for closing the inlet 38. The float 39 is freely supported within the walls of the chamber 37 and is guided for vertical movement on an upstanding tube 41 secured in the bottom of the chamber 37. The tube 41 also serves as a discharge opening from the chamber.

In operation, the reagent 12 spills through the inlet 38 into the valve chamber 37 at a rate much faster than the reagent can be passed through the metering tube 31. As a result, the chamber 37 gradually fills, causing the float 39 to rise until the plug 40 closes the valve inlet 38. Thereafter, the level of the reagent 12 within the valve 36 remains constant. As soon as a small amount of reagent passes through the metering tube 31 and out of the chamber 37, the plug 40 slightly opens the inlet 38 and that amount of reagent is immediately replaced. As a result, a constant head pressure on the reagent at the metering tube is established. In the illustrated form of the analyzer, the reagent head pressure and the length and diameter of the capillary metering tube 31 is selected so that a reagent flow rate into the passage 24 of 0.1 ml./min. is established. It will also be noted that the head established by the float valve 36 is greater than the sample head established by the overflow outlet 27 and thus the sample in the passage 24 is not forced upwardly through the capillary metering tube 31.

A disturbing problem which could affect the operation of the analyzer 10 is the presence of air bubbles within the passage 24 and metering tubes 21, 31. These air bubbles primarily result from air dissolved in the sample fluid which is released by the warming of the fluid as it passes into the room in which the analyzer is located or by the decrease in air solubility of the sample caused by the chemical reaction with the reagent 12. To minimize the effect of air bubbles, a strainer 45 is interposed in the passage 24 so that the fluid sample 11 must pass through the fine holes in the strainer before reaching the capillary metering tubes. This blocks the bubbles from the tubes 21, 31. Furthermore, the entire frame 25 is tilted so that air bubbles tend to remain trapped at the end of the passage 24 adjacent the strainer 45 and the connection point of the sample conduit 22.

As for turbidity particles in the sample 11 or reagent 12, it has been found that by disposing the capillary metering tubes 21 and 31 in generally vertical directions and by establishing the fluid flow through these tubes from top to bottom, the tendency of turbidity particles to clog the tubes is greatly minimized.

For the purpose of mixing and briefly detaining the sample-reagent stream for colorimetric testing, the stream is dripped into a generally vertical transparent mixing cell 50 disposed in the colorimeter 15. The transparent cell 50 is formed with an open bottom and open top and is mounted in a surrounding transparent chamber 51 having an overflow outlet 52 disposed well above the open bottom of the cell 50. A nozzle 53 extends from the discharge end of the capillary metering tube 21 to a position over the open top of the cell 50 so that the sample-reagent stream is dripped downwardly into the cell 50 where it flows down through the cell, out the open bottom of the cell, up through the surrounding chamber 51, and out the overflow outlet 52. The mixture is then directed to a conduit 54 leading to the drain 30.

The dripping of the sample-reagent stream into the cell 50 causes complete mixing of the sample and the reagent, and the slow flow of the mixture down through the cell and up through the surrounding chamber 51 detains the mixture for colorimetric testing while maintaining a constant and uniform flow of the mixture under test. Alternatively, mixing of the sample and reagent in the cell 50 can be accomplished by using a motor driven stirrer or some other mechanical device, in which case the sample-reagent stream need not be dripped into the cell.

To detect a color-producing reaction in the sample-reagent mixture, the colorimeter 15 includes a lamp 60, condensing lens 61, shutter 62, color filter 63 and photoelectric cell 64, all arranged in the conventional manner to direct a beam of light through the fluid mixture passing downwardly through the cell 50. The output of the photoelectric cell 64 is coupled through an adjustable resistance 65 to the galvanometer 16. The wiring circuit also preferably includes a plug socket 66 coupled in parallel to the resistance 65 for permitting a continuous recorder to be added to the electrical circuit so that the output of the photoelectric cell 64 can be used to produce a continuous record.

Alternatively, the output of the colorimeter photoelectric cell 64 can be used to trip a relay for controlling another piece of apparatus. In this way the analyzer 10 can perform as a monitor. For an example of this use of the analyzer 10, the analyzer can be set up to automatically regenerate a zeolite-type of water softener. In such a use, the reagent 12 is an EDTA (ethylene diamine tetra acetic acid) plus pH buffer and an indicator such as Erio Chrome Black T solution with the amount of EDTA selected so as to reach the equivalence point and produce a color reaction at the desired hardness level at which the water softener is to be regenerated. A red filter 63 is used in the colorimeter 15 and the sample conduit 22 is connected to the output of the water softener. As the water softener becomes less and less effective and the hardness of the water increases beyond the selected cut-in point, the sample-reagent mixture in the cell 50 turns from blue to red so that the photoelectric cell 64 is activated to produce a current. This current is then utilized to trip a relay and either sound an alarm or automatically begin regenerating of the water softener.

By using appropriate reagents 12, the analyzer 10 can also be used for detecting pH or residual chlorine levels in water. It will also be understood that more than one reagent can be added to the sample under test simply by using two or more reagent supplies with associated float valves and capillary metering tube assemblies. Such a two-reagent unit has been found suitable for testing fluoride levels in water using a Megregian Maier form of test reaction.

It is of significance to note that the reagent metering tube 31 opens into the passage 24 ahead or upstream of the metering tube 21. This enables the reagent 12 to include small amounts of an anti-mold and slime agent such as formaldehyde as well as a formulation for preventing mineral deposits so as to resist fouling of both of the tubes 21 and 31. However, if tube fouling is not a problem, the analyzer 10 could obviously function properly with the reagent metering tube 31 opening into the sample stream below or downstream of the tube 21.

In accordance with a further aspect of the invention, the method of testing described above can be modified for continuously performing spectrophotometric titration by using a titrant as the reagent added to the sample stream, adding also a constant and uniform flow of an indicator, and alternately reducing and increasing the amount of titrat added to the sample stream so as to repeatedly bring the mixture in the colorimeter cell to end point. That is, the flow of titrant is continuously adjusted so that each time the indicator produces a color change showing that end point of the titration has been reached, the flow of titrant is reduced below the color change producing end point. When the color change again reverses the titrant flow is increased to again bring about an end point reaction.

By continuously increasing and reducing the proportion of titrant added to the steadily flowing sample so as to cause oscillating color changes in the sample-titrant-indicator mixture, a continuous titration is run on the flowing sample. By knowing the sample flow rate and the strength and character of the titrant, and by noting the titrant flow rates required to produce the oscillating color changes, the results of the titration can be easily calculated.

Figure 2:
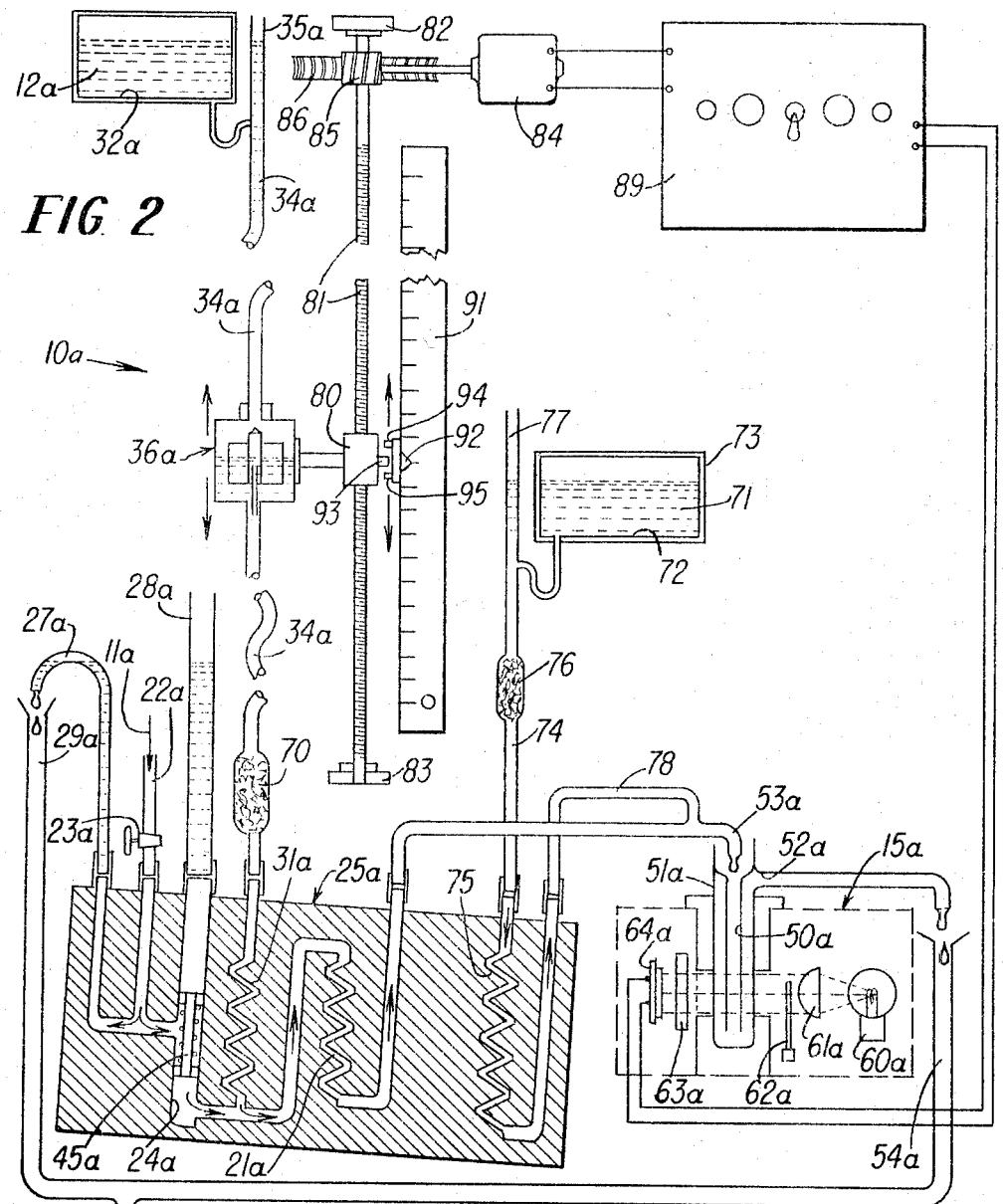
FIG. 2 is a diagrammatic representation of a modified form of automatic analyzer particularly intended for spectrophotometric titration.

To carry out this further aspect of the invention, an analyzer 10a shown in FIG. 2 is provided including apparatus for accomplishing continuously the several steps referred to above so as to capably perform the inventive method. In describing the analyzer 10a, those parts similar to those described in connection with the analyzer 10 in FIG. 1 have been given identical reference numerals with the identifying suffix "a" added.

The analyzer 10a acts upon a sample 11a which is transmitted to a capillary metering tube 21a through a conduit 22a having a flow-control cock 23a. The sample 11a passes from the cock 23a into a mixing passage 24a and through a strainer 45a. A frame 25a supports the metering tube 21a and the associated structure.

An overflow outlet 27a establishes the sample pressure head in the passage 24a and a conduit 29a is provided for carrying the overflowing sample to a drain opening 30a. A sight glass 28a visually indicates the sample head.

For adding titrant 12a to the passage 24a, the titrant is supported in a bag 32a and is conducted through a conduit 34a to a capillary metering tube 31a which opens into the passage 24a. A sight glass visually indicates the supply of titrant 12a remaining in the bag 32a.

To maintain a predetermined head pressure on the titrant 12a at the metering tube 31a, a float valve 36a is interposed in the conduit 34a. The float valve 36a functions internally as does the float valve 36 described above. Also interposed in the conduit 34a is a filter 70 to prevent solid particles from being lodged in the capillary metering tube 31a.

In addition to the sample 11a and titrant 12a, an indicator 71 is also added to the stream under test. For adding the indicator 71 to the sample-titrant stream, a supply of indicator is disposed in a plastic bag 72 carried within a carton 73, and a conduit 74 couples the bag 72 to a capillary metering tube 75. Preferably, a filter 76 is interposed in the conduit 74. A sight glass 77 is provided to visually indicate the amount of indicator 71 remaining in the bag 72.

The head pressure on the indicator 71 and the length and diameter of the metering tube 75 are selected so that an indicator flow rate through the metering tube of about 0.1 ml./min. is achieved. This flow rate is not particularly critical and will vary as the indicator 71 empties from the bag 72. Of course, a valve similar to the valve 36a can be interposed in the conduit 74 if it is desired to stabilize the indicator flow rate. A conduit 78 connects the lower output end of the metering tube 75 to a nozzle 53a which feeds the sample-titrant-indicator stream to a colorimeter 15a.

For mixing and briefly detaining the fluid stream from the nozzle 53a in the colorimeter 15a, a vertical transparent cell 50a having an open top and open bottom, surrounded by a transparent chamber 51a having an overflow outlet 52a, is provided. The overflow outlet empties into a conduit 54a which leads to the drain 30a. The colorimeter 15a includes a lamp 60a, condensing lens 61a, shutter 62a, filter 63a and photoelectric cell 64a all arranged in the conventional manner to transmit a beam of light through the fluid mixture passing downwardly through the cell 50a. The operation of the cell-surrounding chamber 51a and overflow outlet 52a in establishing a uniform continuous flow of the mixture under test through the colorimeter 15a is as described above in connection with the FIG. 1 modification.

In order to change the flow rate of the titrant 12a and thus cause oscillating color changes in the cell 50a, the float valve 36a is vertically adjustable and the output of the colorimeter photoelectric cell 64a is used to vary the vertical position of the valve 36a and thus vary the head pressure on the titrant at the metering tube 31a. In this way, the flow rate of the titrant added to the stream of sample 11a in the passage 24a is varied. In the illustrated construction, the valve 36a is mounted on a bracket 80 that is threaded on a lead screw 81 journaled at 82 and 83 in the analyzer 10a. The screw 81 is rotatably driven by a motor 84 through a worm 85 and gear 86.

Figure 3:
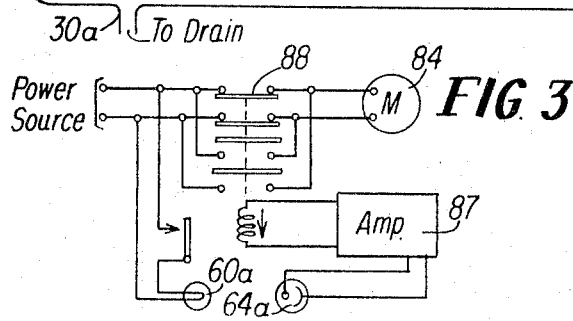
FIG. 3 is a schematic wiring diagram of the circuit utilized in the analyzer shown in FIG. 2.

The motor 84 is continuously driven and the photoelectric cell 64a, through an amplifier 87, drives a relay 88 which controls the direction of rotation of the motor 84 (see FIG. 3). In the embodiment shown in FIG. 2, the amplifier 87 and relay 88, together with appropriate fuses and on/off switches, are enclosed within a box 89.

To permit the float valve 36a to be raised and lowered by running the bracket 80 up and down the lead screw 81, the conduit 34a is flexible and of a sufficient length to provide the desired range of movement of the float valve.

To illustrate the function of the analyzer 10a, it will be assumed that the analyzer has been set up to measure the total hardness of a water stream within a range of zero to 250 parts per million. The titrant 12a is preferably a standard EDTA solution in a concentration suitable for the selected range of hardness. A standard hardness buffer-indicator is used as the indicator 71 which normally produces a red color when added to the water-EDTA solution but which turns blue at the titration end point indicating a complete reaction between the water hardness elements and the EDTA solution. A red filter 63a is employed.

When the operation of the analyzer 10a adjusted as described above is begun, the color in the colorimeter cell 50a is red so that the photoelectric cell 64a receives radiation and produces an electrical output which is amplified by the amplifier 87 and is effective to operate the relay 88. With the relay 88 picked up, the continuously energized motor 84 is driven in a direction so as to cause the lead screw 81 to raise the bracket 80 and thus lift the float valve 36a. As the float valve 36a rises, the rate of titrant flow into the passage 24a is increased until the increased amount of titrant causes the titration end point to be reached and the fluid mixture in the cell 50a to turn blue. The filter 63a absorbs the blue light passing through the fluid in the cell 50a so that the photoelectric cell 64a causes to be activated whereupon the relay 88 drops out and motor 84 is reversed to drive the bracket 80 and thus the float valve 36a downwardly.

Downward movement of the float valve 36a causes a decrease in the flow rate of the titrant into the passage 24a until the mixture in the cell 50a goes past the end point of the titration reaction and the solution again turns red with the result that the photoelectric cell 64a is again activated and the motor 84 reversed.

The apparatus 10a thus embodies a form of oscillating feedback, with the raising and lowering of the valve 36a causing color oscillations in the fluid mixture being sensed in the colorimeter cell 50a. The color oscillations in turn produce the raising and lowering motion of the float valve 36a. In the illustrated embodiment under discussion, it requires about five minutes to produce a reversal of the motor 84 and the range of travel of the float valve 36a is approximately one quarter of an inch.

To enable the results of the titration performed by the analyzer 10a to be read directly, a scale 91 and pointer 92 are associated with the vertically movable bracket 80 so as to indicate the position of the float valve 36a and thus the relative head pressure of the titrant 12a. The scale 91 is calibrated so that the position of the valve 36a is translated directly into terms of the amount of unknown in the sample being tested. In the example being discussed herein, the scale 91 thus reads in total hardness values from zero to 250 p.p.m.

So as to obtain an average reading as the valve 36a oscillates up and down, a lost-motion connection is provided between the pointer 92 and the bracket 80. In the illustrated embodiment, the bracket 80 carries a pin 93 which moves between spaced bumpers 94 and 95 carried by the pointer 92. The pointer is frictionally supported on the scale 91. The spacing between the bumpers 94, 95 is approximately the normal oscillating distance of the float valve 36a, that is, one quarter of an inch in the present example. The pointer 92 thus stands stationary so long as the sample 11a remains constant and the float valve 36a simply oscillates back and forth. As soon as the amount of unknown changes in the sample 11a, the movement of the float valve 36a is also correspondingly changed and the position of the pointer 92 is modified to correspond to the change detected in the sample 11a.

Alternatively, the scale 91 and pointer 92 combination can be replaced by a slide wire resistor with the sliding contact being carried by the bracket 80 and the resistance wire extending alongside of the lead screw 81. In this way, the vertical position of the float valves 36a can be made to control a variable electrical output and this output can be coupled to an electrically-responsive recorder of standard type to produce a continuous record of the titration operation performed by the analyzer 10a.

The analyzer 10a can also be employed, in addition to testing for total hardness in water, for performing silica and alkalinity analysis on water. It is also obvious that other titration procedures can be automatically and capably performed by the analyzer 10a simply by utilizing proper titrants and indicators.

Those skilled in the art will observe that the analyzers 10 and 10a are relatively simple in design and hence adapted for economical manufacture and operation. The fact that few moving parts such as pumps or valves are utilized in the construction of the analyzers so that the few operating difficulties are encountered so that the units are quite reliable and require little routine maintenance.

I claim as my invention:
1. Apparatus for continuously combining measured quantities of two fluids in varying proportion comprising, in combination, a frame block, said block having a combining passage with a capillary metering tube at one end opening to a discharge outlet, a first conduit including a passage in said block for conducting a stream of the first fluid to said combining passage, means defining an overflow outlet opening through said block to said combining passage for establishing a constant head pressure on said first fluid in the combining passage, said block having a second metering tube with one end opening into said combining passage, a second conduit coupled to the other end of said second metering tube for conducting a stream of said second fluid to said combining passage, and a vertically movable float valve interposed in said second conduit so that the head pressure, and thus the flow rate, of said second fluid to said passage can be varied to vary the proportion of said fluids being combined.

2. Apparatus for continuously combining measured quantities of two fluids comprising, in combination, a frame block, said block having a combining passage with a capillary metering tube at one end opening to a discharge outlet, a first conduit including a passage in said block for conducting a stream of the first fluid to said combining passage, means defining an overflow outlet opening through said block to said combining passage for establishing a constant head pressure on said first fluid in the combining passage, said block having a second metering tube with one end opening into said combining passage, a second conduit coupled to the other end of said second metering tube for conducting a stream of said second fluid to said combining passage, and a float valve interposed in said second conduit so that the head pressure, and thus the flow rate, of said second fluid to said passage is established by the height of said float valve.

References Cited by the Examiner
UNITED STATES PATENTS

| 2,645,463 | 7/1953 | Stearns | 259—4 |
| 3,102,789 | 9/1963 | Pirsh et al. | 23—253 |

OTHER REFERENCES

Eckman, Donald P., Automatic Process Control, John Wiley & Sons, Inc., New York (1958), pages 62 and 65.

MORRIS O. WOLK, *Primary Examiner.*

H. A. BIRENBAUM, *Assistant Examiner.*